United States Patent [19]

Mowbray et al.

[11] 4,074,659
[45] Feb. 21, 1978

[54] CATTLE DUSTING BAG

[75] Inventors: Warwick Mowbray, Beenleigh; Richard Hart, West Pennant Hills; William Cavey, Kyle Bay, all of Australia

[73] Assignee: Ciba-Geigy Corporation, Ardsley, N.Y.

[21] Appl. No.: 731,155

[22] Filed: Oct. 12, 1976

[30] Foreign Application Priority Data

Oct. 15, 1975   Australia .............................. 3580/75

[51] Int. Cl.² ............................................. A01K 29/00
[52] U.S. Cl. .................................................... 119/159
[58] Field of Search ......................................... 119/159

[56] References Cited

U.S. PATENT DOCUMENTS

| 3,494,333 | 2/1970 | Mommer | 119/159 |
| 3,563,209 | 2/1971 | Mommer | 119/159 |
| 3,902,461 | 9/1975 | Cortner, Jr. | 119/159 |

Primary Examiner—Hugh R. Chamblee
Attorney, Agent, or Firm—Harry Falber

[57] ABSTRACT

A cattle dusting bag comprising
  an outer bag of thermoplastic material open at its lower end,
  an inner bag consisting of a substantially rigid porous cloth, having a heavily sewn seam at its upper end, said inner bag being divided into an upper portion and a lower dispensing portion by readily removable transverse stitching, the said upper portion being lined or impregnated with an imperious material and containing the ectoparasiticidal dusting agent prior to use and
  a slit metal pipe by means of which the dusting bag is to be suspended the heavily sewn seam of the inner bag within the upper end of the outer bag being received and retained within the slit of the metal pipe.

2 Claims, 4 Drawing Figures

CATTLE DUSTING BAG

The present invention relates to a cattle dusting bag for the control of ectoparasites on cattle.

The presently known cattle dusting bags used for the control of ectoparasites on cattle are essentially of two types.

The first type is a re-usable bag, usually made of an outer bag of canvas with an inner hessian bag, which, in some cases is supported by a nylon mesh. The bags are held together by eyelets or sewn together. The bags are refilled either by a sleeve at the end of the inner bag under the canvas or a zipper or slit in the upper side of the inner bag.

The second type of dust bag is the ready-to-use type which usually has an outer bag made from an impervious plastic such as polyvinylchloride or bonded polypropylene and an inner hessian bag. The inner and outer bags are held together by stitching and/or eyelets.

From these known types the re-usable bags are initially very expensive while the disposable ready-to-use bags although having a lower unit price have a high per animal cost. Furthermore the eyelets and or stitching used for joining the inner and outer bags of the known dusting bags allow entry of rain which detrimentally effects the function of the bags.

It is the object of the present invention to provide a cattle dusting bag for the control of ectoparasites on cattle which is initially cheap, re-usuable and safe in function.

One embodiment of the cattle dusting bag according to the present invention is as illustrated in the accompanying drawings, in which.

Figure 1:
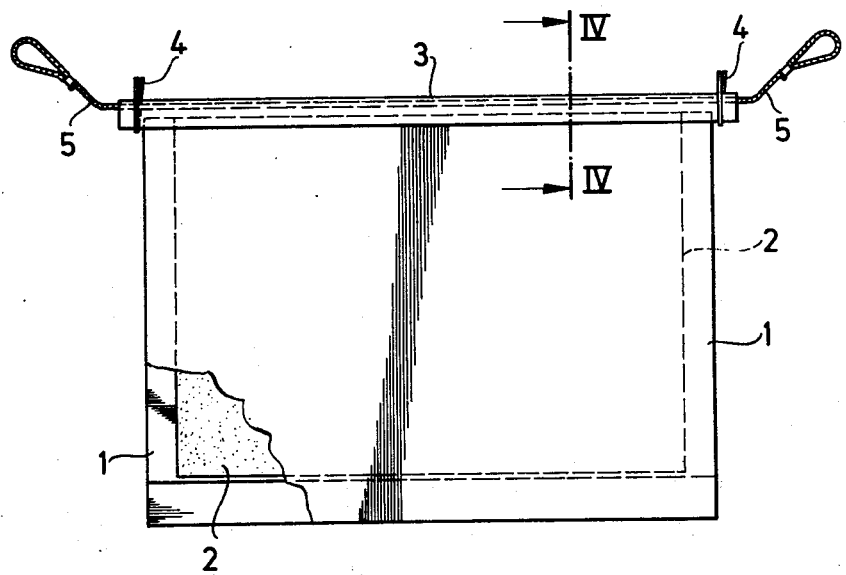
FIG. 1 is a front plan view of a cattle dusting bag according to the present invention.

The cattle dusting bag according to the present invention comprises an outer bag 1 of thermoplastic material which is heat sealed or glued at the sides and open at the lower end, an inner bag 2 consisting of a substantially rigid porous cloth, having a heavily sewn seam 9 at its upper end, said inner bag 2 being divided into an upper portion 2a and a lower dispensing portion 2b by readily removable transverse stitching 6, the said upper portion 2a being lined or impregnated with an imperious material and containing the ectoparasiticidal dusting agent prior to use and a slit metal pipe 3 by means of which the dusting bag is to be suspended the heavily sewn seam 9 of the inner bag within the upper end of the outer bag being received and retained with in the slit 8 of the metal pipe 3.

As heat-sealable or glued thermoplastic materials for the outer bag 1, foils made from polymers such as polyvinyl chloride, polyamide, polyester and polyethylene are used. A preferred material for constructing the outer bag is bonded polypropylene.

A preferred material for the inner porous bag 2 is hessian cloth.

The upper part 2a of the inner bag 2 is lined with impervious material, e.g. such as tarred paper, to retain the ectoparasiticidal dust prior to use. The lined upper portion 2a of the bag containing the ectoparasiticidal dust is sealed off by stitching with a transverse, readily removable thread 6 running between the said lined portion 2a and the lower porous portion 2b. After the bags are hung for use with cattle the readily removable e.g. rip-stitched, thread 6 on the inner bag 2 is removed by pulling to release the dust into the lower dispensing part 2b of the said bag.

The split metal pipe 3 to be used according to the present invention is preferably an aluminium alloy or a galvanised tube, having an inner diameter of about 2 cm and a split of about 3 mm width along its length. The split pipe 3 is further provided at each end with means for squeezing said split together and/or blocking the ends in order to prevent the bag from coming out. For this purpose clips 4 or bolts are for example suitable.

Preferably in the cattle dusting bag according to the invention the heavily sewn seam 6 of the inner bag 2 is retrained in the slit 8 of the metal pipe 3 by means of clips 4 placed around the pipe 3 to compress the said pipe 3 and urge the edges of the slit 8 together.

As suspending means for the dusting bag according to the present invention known means such as hooks or cords may be used. Preferably a cord 5 is used which passes inside the length of the pipe 3.

For forced use the dust bags according to the present invention may be hung in barn doors or alleyways leading from animal buildings, salt or mineral blocks or watering holes. For free choice use the dust bags may be placed in loafing sheds, holding pens, feedlots, near watering holes or other areas where cattle gather.

After the first dust charge has been exhausted the clips or bolts are removed, the pipe is slid off the inner hessian bag which is then replaced by a new dust filled bag and the pipe is put back in place. If appropriately strong thermoplastic material is used two to three refills are possible. More specifically with regard to the drawings, FIG. 1 shows the whole dusting bag with outer waterproof bag 1, inner porous hessian bag 2, which contains the ectoparasiticidal dust, split pipe 3 with clips 4 at each end, and cord 5 for suspending the bag.

Figure 2:
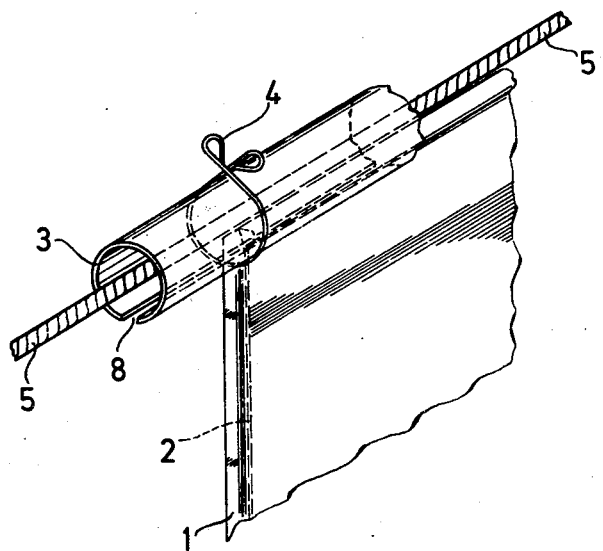
FIG. 2 is a partial view in perspective depicting primarily the bag closing mechanism.

FIG. 2 shows the end of the split pipe with introduced outer bag 1 covering inner hessian bag 2, clip 4 and cord 5 passing through pipe 3.

Figure 3:
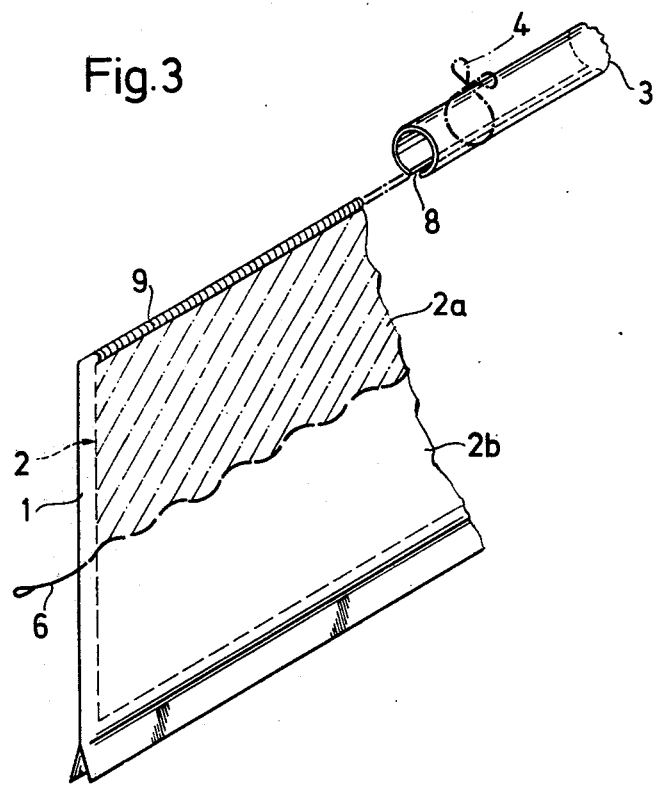
FIG. 3 is a partial view in perspective of said bag.

FIG. 3 shows split pipe 3 with clips 4 and split 8 in position to be slid along the upper edge of outer bag 1 containing inner hessian bag 2 with heavily sewn bag seam 9 and thread 6 running across the bag between the lined portion 2a and the porous portion 2b of the bag.

Figure 4:
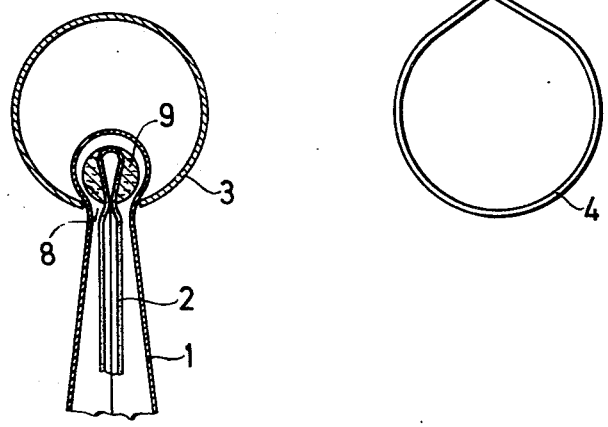
FIG. 4 is a side view taken along line IV-IV of FIG. 1.

FIG. 4 shows an end view of the dust bag with outer bag 1 containing inner hessian bag 2 with heavily sewn seam 9 introduced into split pipe 3 which is held in place by means of clip 4.

What we claim is:

1. A cattle dusting bag comprising
   a. an outer bag of thermoplastic material open at its lower end.
   b. an inner bag consisting of a substantially rigid porous cloth, having a heavily sewn seam at its upper end, said inner bag being divided into an upper portion and a lower dispensing portion by readily removable transverse stitching, the said upper portion being lined or impregnated with an impervious material and containing the ectoparasiticidal dusting agent prior to use and
   c. a slit metal pipe by means of which the dusting bag is to be suspended the heavily sewn seam of the inner bag within the upper end of the outer bag being received and retained with in the slit of the metal pipe.

2. A cattle dusting bag according to claim 1 wherein the heavily sewn seam of the inner bag is retained in the slit of the metal pipe by means of clips placed around the pipe to compress the said pipe and urge the edges of the slit together.

* * * * *